US 8,488,491 B2

(12) United States Patent
Moreno et al.

(10) Patent No.: US 8,488,491 B2
(45) Date of Patent: Jul. 16, 2013

(54) COMPRESSED VIRTUAL ROUTING AND FORWARDING IN A COMMUNICATIONS NETWORK

(75) Inventors: Victor Moreno, Carlsbad, CA (US); Dino Farinacci, San Jose, CA (US); Patrice Bellagamba, Saint-Raphael (FR); Hasmit Grover, Fremont, CA (US); Dhananjaya Rao, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 822 days.

(21) Appl. No.: 12/590,656

(22) Filed: Nov. 12, 2009

(65) Prior Publication Data

US 2011/0110370 A1     May 12, 2011

(51) Int. Cl.
*H04L 12/28*     (2006.01)

(52) U.S. Cl.
USPC .......................... 370/254; 370/400; 709/220

(58) Field of Classification Search
None
See application file for complete search history.

(56) References Cited

U.S. PATENT DOCUMENTS

| 6,856,991 | B1 | 2/2005 | Srivastava | |
| 7,720,009 | B2 * | 5/2010 | Mellachervu et al. | 370/255 |
| 7,894,450 | B2 * | 2/2011 | Unbehagen et al. | 370/395.3 |
| 8,166,205 | B2 * | 4/2012 | Farinacci et al. | 709/249 |
| 8,194,664 | B2 * | 6/2012 | Dharwadkar | 370/392 |
| 2003/0026260 | A1 | 2/2003 | Ogasawara et al. | |
| 2003/0112799 | A1 | 6/2003 | Chandra | |
| 2003/0142685 | A1 | 7/2003 | Bare | |
| 2003/0225887 | A1 | 12/2003 | Purnadi et al. | |
| 2005/0163146 | A1 | 7/2005 | Ota et al. | |
| 2006/0159083 | A1 | 7/2006 | Ward et al. | |
| 2006/0209831 | A1 | 9/2006 | Shepherd et al. | |
| 2008/0120176 | A1 | 5/2008 | Batni et al. | |
| 2009/0037607 | A1 | 2/2009 | Farinacci et al. | |
| 2009/0296575 | A1 * | 12/2009 | Nakai | 370/230 |

OTHER PUBLICATIONS

Rosen et al., "BGP/MPLS VPNs", IETF RFC 2547, Mar. 1999.
Housley et al., "EtherIP: Tunneling Ethernet Frames in IP Datagrams", IETF RFC 3378, Sep. 2002.
Psenak et al., "Multi-Topology (MT) Routing in OSPF", IETF RFC 4915, Jun. 2007.
Przygienda et al., "M-ISIS: Multi Topology (MT) Routing in Intermediate System to Intermediate Systems (IS-ISs)", IETF RFC 5120, Feb. 2008.

* cited by examiner

*Primary Examiner* — Brian Roberts
(74) *Attorney, Agent, or Firm* — Cindy Kaplan (57) ABSTRACT

In one embodiment, an apparatus includes a plurality of network site interfaces in communication with two or more networks, each of the networks associated with a different Virtual Routing and Forwarding (VRF) instance, and a processor configured for mapping the VRF instances to an Interior Gateway Protocol (IGP) adjacency and transmitting VRF information on the IGP adjacency along with a VRF identifier indicating the network associated with the VRF information. A method is also disclosed.

20 Claims, 6 Drawing Sheets

COMPRESSED VIRTUAL ROUTING AND FORWARDING IN A COMMUNICATIONS NETWORK

BACKGROUND

The present disclosure relates generally to virtual routing and forwarding in a communications network.

VRF (Virtual Routing and Forwarding or VPN (Virtual Private Network) Routing and Forwarding) is a technology implemented in a network device that allows multiple instances of a routing table to exist simultaneously on the same network device. The simplest form of VRF implementation is VRF lite, in which each router within the network participates in the virtual routing environment in a peer-based fashion. Conventional implementation of VRF lite results in many deployment challenges and scalability limitations.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving Virtual Routing and Forwarding (VRF) information at a network device, the VRF information associated with a network comprising a plurality of network sites and a VRF identifier, processing the VRF information at the network device, wherein processing comprises mapping the VRF identifier to an Interior Gateway Protocol (IGP) adjacency, and transmitting the VRF information with the VRF identifier on the IGP adjacency. Multiple VRF identifiers-associated with different networks are mapped to the IGP adjacency at the network device.

In another embodiment, an apparatus generally comprises a plurality of network site interfaces in communication with two or more networks, each of the networks associated with a different VRF instance, and a processor configured for mapping the VRF instances to an Interior Gateway Protocol (IGP) adjacency and transmitting VRF information on the IGP adjacency along with a VRF identifier indicating the network associated with the VRF information.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications without departing from the scope of the invention. Thus, the invention is not to be limited to the embodiments shown, but is to be accorded the widest scope consistent with the principles and features described herein. For purpose of clarity, details relating to technical material that is known in the technical fields related to the embodiments have not been described in detail.

VRF (Virtual Routing and Forwarding or VPN (Virtual Private Network) Routing and Forwarding) is an extension of IP routing that provides multiple routing instances. VRF lite allows a core network to support multiple networks (e.g., VPNs) with overlapping IP addresses. Conventional deployment of VRF lite is challenging from an operational perspective, due in part to the large number of adjacencies, configuration and state maintenance in the core network, and maintenance of a large number of sub-interfaces over many physical interfaces. For example, conventional VRF lite requires monitoring and maintenance of a multitude of IGP (Interior Gateway Protocol) adjacencies and provides a hop-by-hop approach to VPN creation, which requires VRF configuration and state to be maintained in the core.

The embodiments described herein provide for simplification of the operational environment of VRF lite and optimization of the scalability of implementation. In one embodiment, VRF information is compressed onto a consolidated adjacency to improve the manageability of multiple VRF instances. As described in detail below, an overlay network may be used in one or more embodiments to create a single-hop, single interface overlay topology that allows further simplification of the routing intelligence, as well as simplification of the interfaces.

Figure 1:
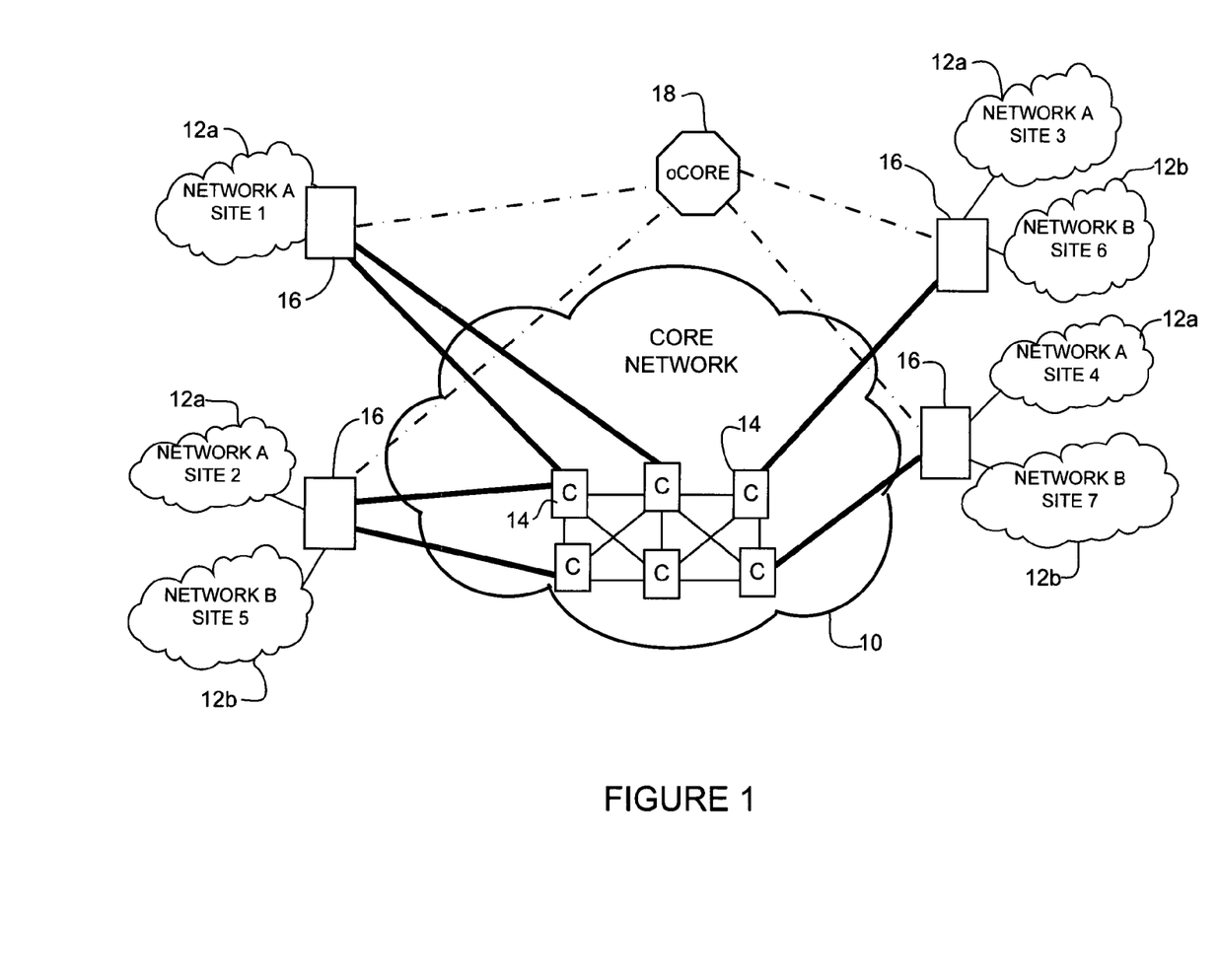
FIG. 1 illustrates an example of a network in which embodiments described herein may be implemented.

Referring now to the drawings, and first to FIG. 1, an example of a network in which the embodiments described herein may be implemented is shown. The embodiments operate in the context of a data communications network including multiple nodes. Some of the nodes in a network that employs the embodiments may be network devices such as routers, gateways, or switches. The example shown in FIG. 1 includes network A having network sites 12a (sites 1, 2, 3, and 4) and network B having network sites 12b (sites 5, 6, and 7). Network A and network B may be, for example, VPNs or any other collection of network sites (e.g., subnets, leaf networks) that are typically controlled by a single administration or organization and share a common routing table. Many of the network sites 12a, 12b are in communication through core network 10. The core network 10 includes core nodes (e.g., routers) 14. The core network 10 may be a Layer 3 (L3) IP network core, Layer 2 (L2) network core, an MPLS core, or any other network capable of forwarding IP packets. The network sites 12a, 12b communicate with the core network 10 via a network device 16 (e.g., router, switch), which is a multi-VRF edge device. Multiple customer edge devices at network sites 12a, 12b connect to the multi-VRF edge device 16, which connects to an edge device at the core network 10. As described in detail below, the edge device 16 maintains separate VRF tables associated with different networks (e.g., VRF A for network A, VRF B for network B). In one embodiment, the edge devices 16 are configured to run an overlay network 18, described further below.

It is to be understood that the network shown in FIG. 1 is only one example and the embodiments described herein may operate in various network topologies having any number or types of subnets, VPNs, or network devices. Also, the overlay network 18 illustrated in FIG. 1 is an example of an optimized topology, however, the embodiments may be implemented in a network without an overlay network, as shown in FIG. 2.

Figure 2:
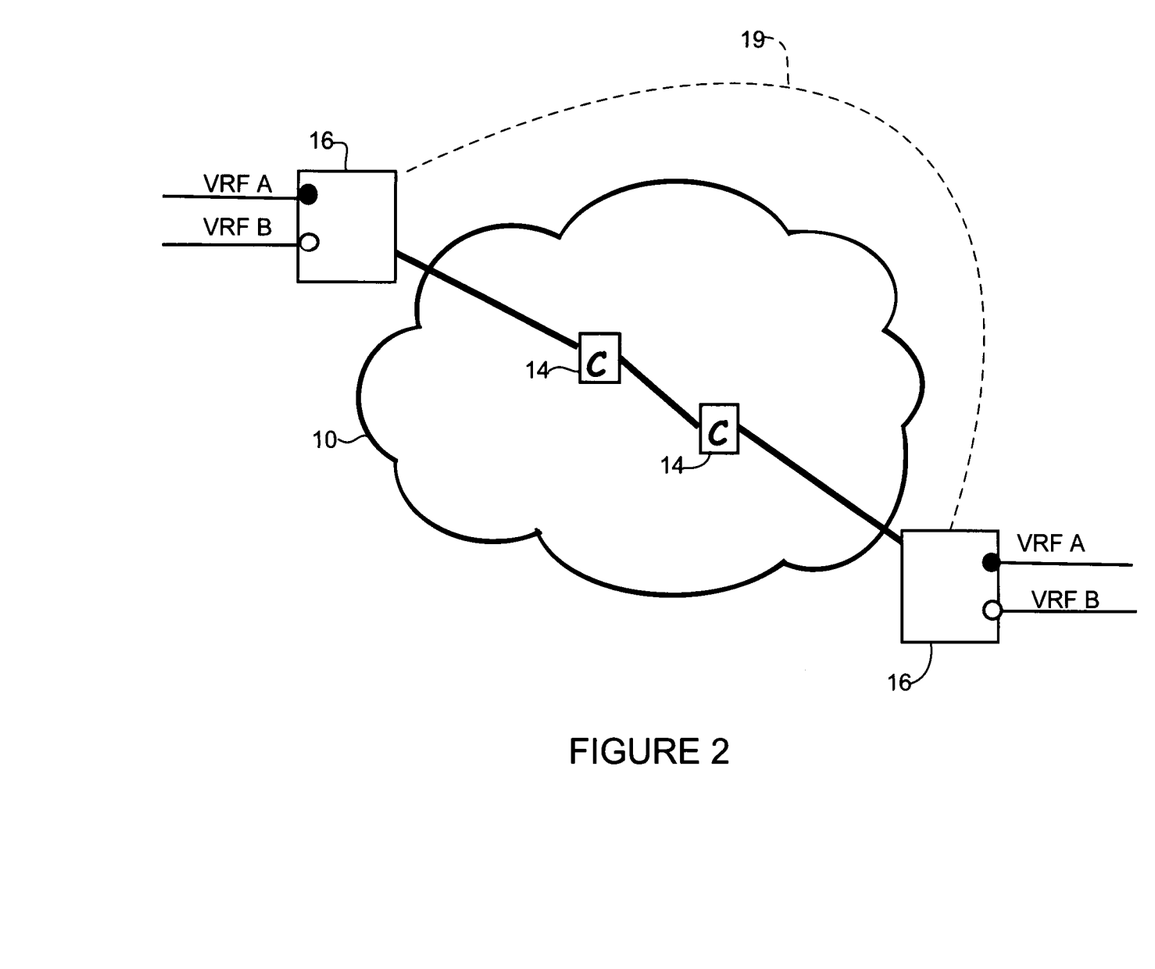
FIG. 2 illustrates an example of a common adjacency for transmitting VRF information in the network of FIG. 1.

FIG. 2 illustrates compression of VRF information into a consolidated adjacency 19. It is to be understood that the term "adjacency" as used herein refers to a single adjacency or set of adjacencies, as used for multiple separate physical routers. Conventional implementation of VRF lite requires a separate adjacency for each VRF instance. As schematically shown in FIG. 2, embodiments described herein utilize a common adjacency (indicated at line 19), to carry information for two different VRF instances (VRF A and VRF B). Thus, the embodiments described herein map multiple VRF instances (VRFs) to one adjacency. Whereas, conventional implementations require a one to one mapping between each VRF and a separate adjacency. The example shown in FIG. 2 illustrates two VRFs mapped to a common adjacency 19, however, any number of VRFs may be consolidated on the adjacency. In one embodiment, multi-topology extensions are used to multiplex the different VRFs into a single set of routing updates and adjacencies. Details of the multi-topology extensions are described below, following an overview of the control plane and protocol interactions at the edge device 16.

Figure 3:
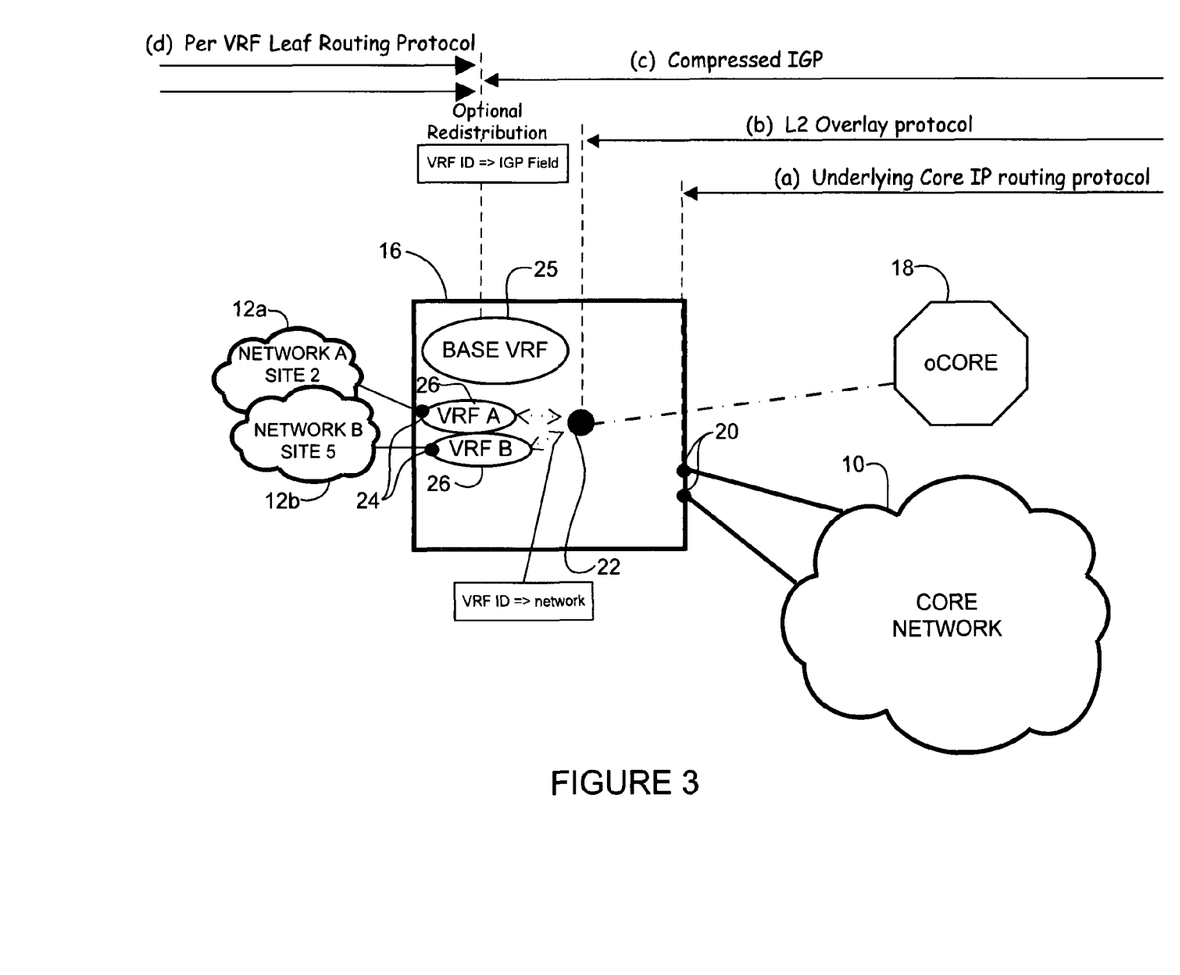
FIG. 3 illustrates interaction between a core network, network sites, and an overlay network at an edge device in the network of FIG. 1, in accordance with one embodiment.

FIG. 3 illustrates interaction between the edge device 16 and the network sites 12a, 12b, core network 10, and overlay network 18, in accordance with one embodiment. Also shown in FIG. 3 are the control planes and termination points of the different protocols which may be implemented in the embodiments described herein. A description of the core facing interfaces and protocols are first provided, followed by a description of the site facing interfaces and protocol.

The core network 10 represents an underlying IP core network, also referred to herein as uCore. The core network 10 communicates with the edge device 16 at the core physical interfaces 20. The routing protocol running in the core network 10 is referred to herein as uRP (underlying core IP routing protocol) (indicated at (a) in FIG. 3). The underlying routing protocol may be any combination of routing protocols, including IGP (pIGP (provider IGP)) and BGP (Border Gateway Protocol). The overlay core (oCore) 18 is the logical core network resulting from the overlay network. The overlay core network 18 communicates with the edge device 16 using an L2 overlay protocol, also referred to herein as overlay IGP (oIGP) (indicated at (b) in FIG. 3). An overlay core interface 22 is a logical interface between the overlay core 18 and edge device 16. As described below, a VRF identifier (VRF ID) is associated with the network (e.g., VPN ID) at the interface between the VRF domain and the overlay network 18 (VRF ID=>network). The overlay core IP routing protocol is a compressed IGP, also referred to herein as Layer 3 overlay protocol (indicated at (c) in FIG. 3). As noted above, use of the overlay network 18 is optional. Thus, the compressed IGP may run directly over the core network 10 in one or more of the embodiments.

Referring now to the interaction between the edge device 16 and the network sites 12a, 12b, leaf IP interfaces 24 are shown at the edge of the compressed VRF domain. The interfaces 24 may be physical or logical (e.g., sub-interface or SVI (Switch Virtual Interface)). Each interface 24 is associated with a corresponding VRF instance 26 (VRF A, VRF B). The routing protocol running at the edges of the compressed VRF domain is a leaf routing protocol (LRP) (indicated at (d) in FIG. 3). LRP receives associated compressed IGP routing through redistribution (e.g., VRF ID=>IGP Field (MT ID)), described below.

As illustrated in FIGS. 2 and 3, the per VRF leaf routing protocol only extends into the edge device 16. In the case of conventional non-compressed VRFs, the per VRF leaf routing protocol extends through the core network 10. In one embodiment, the VRF IDs are used to discriminate between different VRFs, which are carried over the core network 10 on the common adjacency 19. The VRF IDs are thus used to 'color' updates as relevant for a specific VRF instance. The identifier may be, for example, a per-VRF prefix. Associated SPF (Shortest Path First) database, RIB (Routing Information Base), and FIB (Forwarding Information Base) calculations are performed for different VRFs. In order to support a single adjacency, the base VRF 25 is defined over which the adjacency is established. All VRFs 26 leverage the single adjacency in the base VRF 25. The base VRF 25 may be, for example, a global routing table, described below with respect to FIG. 6.

Figure 4:
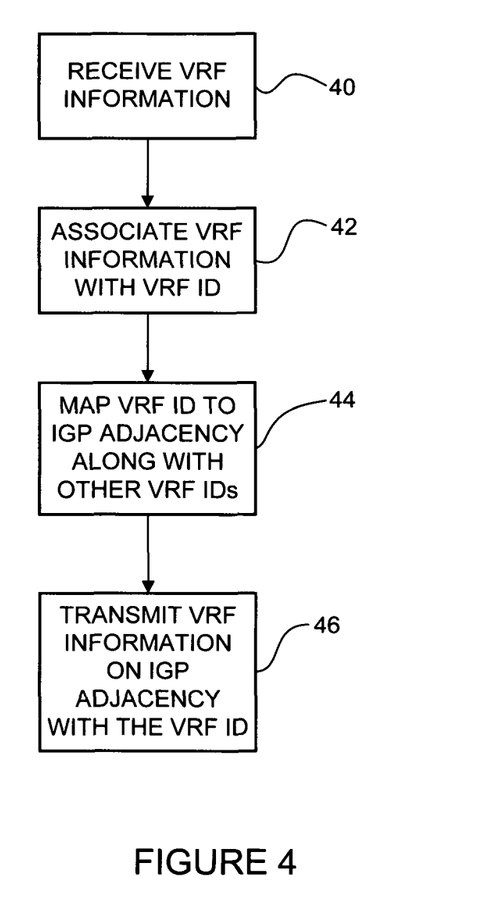
FIG. 4 is a flowchart illustrating an overview of a process for transmitting VRF information on the adjacency of FIG. 2, in accordance with one embodiment.

FIG. 4 is a flowchart illustrating an overview of a process for compression of VRF information on a consolidated adjacency, in accordance with one embodiment. The information may be, for example, a VRF table, updates to a VRF table, routing information relevant to a specific VRF instance, etc. At step 40, VRF information is received at the network device 16. The information is received from one of the network sites 12a, 12b. The VRF information is associated with a VRF ID assigned to the network (network A, network B) to which the site belongs (step 42). The VRF ID is mapped to an IGP adjacency (i.e., single adjacency or single set of adjacencies) at the network device 16, along with other VRF IDs associated with other networks in communication with the network device (step 44). The VRF information is transmitted on the IGP adjacency with the VRF ID (step 46).

In one embodiment, the VRF IDs are carried in Multi-Topology (MT) extensions to OSPF (Open Shortest Path First) or IS-IS (Intermediate System to Intermediate System) as defined in P. Psenak et al, "Multi-Topology (MT) Routing in OSPF", IETF RFC 4915, June 2007, and T. Przygienda et al., "Multi-Topology (MT) Routing in Intermediate System to Intermediate Systems (IS-ISs)", IETF RFC 5120, February 2008, respectively. The extensions are used to multiplex VRF information into a consolidated set of routing updates and adjacencies. One or more fields in an IGP packet are used to allow multiple VRFs on a single adjacency. In one example, a ToS (Type of Service) field in an OSPF packet is used to transmit the VRF ID. In another example, a TLV (Type, Length, Value) field in an IS-IS packet is used to transmit the VRF ID. The packets may also be configured with a dedicated VRF ID field to prevent overloading of existing MT-ID fields.

Any given VRF may have different IGP instances active on different interfaces. For example, a VRF may have a compressed IGP instance active on its west facing interfaces and a traditional IGP instance active on its east facing interfaces. Route redistribution of one instance may be used to provide continuity between a compressed IGP and traditional IGP. However, the boundary could be implemented in such a way that redistribution would not be necessary, but the IGP accommodates both compressed and traditional interfaces on the same device. Also, directly connected networks do not need to be redistributed into the compressed IGP, but instead may be handled natively as with traditional IGP.

The following describes implementation of compressed VRFs with the overlay network 18. The overlay network 18 may be used with compressed VRFs to provide a single-hop, single interface overlay topology. However, it is to be understood that the VRF compression described above is independent of the data plane and may also be used in a hop-by-hop environment, without leveraging the overlay network.

Figure 5:
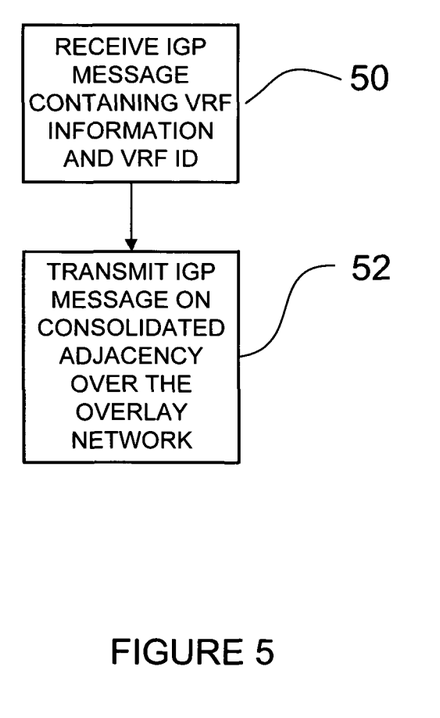
FIG. 5 is a flowchart illustrating an overview of a process for transmitting VRF information over the overlay network, in accordance with one embodiment.

FIG. 5 is a flowchart illustrating an overview of a process for implementing an overlay network at the control plane for use with VRF compression, in accordance with one embodiment. At step 50, an IGP message containing VRF information and a VRF ID, which associates the information with a specific VRF instance, is received at an egress interface at the network device 16. The IGP message is transmitted on the consolidated adjacency over the overlay network 18 (step 52) (FIGS. 3 and 5).

In one embodiment, the overlay network 18 utilizes OTV (Overlay Transport Virtualization), described in U.S. Patent Application Publication No. 2009/0037607, published on Feb. 5, 2009, which is incorporated herein by reference in its entirety. OTV provides an "overlay" mechanism for doing virtualization versus traditional "in-the-network" type systems, in which multiple routing and forwarding tables are maintained in every device between a source and a destination. With OTV, state is maintained at the network edges, but is not required at other devices in a network site or in a core network. The overlay-SPF core node topology is single-hop and may not require a core SPF to run. Whereas, the underlying SPF core node topology is multi-hop and uses a core SPF. OTV operates at the edge devices 16 interposed between the network sites 12a, 12b and the core network 10 (FIG. 1). The edge devices 16 perform learning and forwarding functions on their site-facing interfaces (internal interfaces) 24 and perform IP based virtualization functions on their core-facing interfaces 20, for which the overlay network 18 is created (FIG. 3). OTV is independent of the technology deployed in the core network 10 and no changes are required to core devices 14. OTV can support, for example, unicast, multicast, and IPv6 traffic transparently in the core network 10. Since the overlay interconnect is transparent to the core, the embodiments may be implemented over any core, regardless of whether the network is managed by a Service Provider (SP) or Enterprise.

The use of OTV simplifies the core node topology by creating a single-hop overlay topology (oCore) and reduces the number of managed core facing interfaces. The core node topology SPF calculations are no longer mandatory for the compressed IGP since it is not required for the oCore single-hop topology. If SPF calculations for the core node topology are omitted, any hops beyond the oCore single-hop topology are handled by a different IGP instance and redistribution occurs. Routing information is exchanged with the compressed VRF domain by redistribution and the multiplexed core facing interfaces are simplified by eliminating the need for core facing VRF specific logical sub-interfaces.

Since the oCore is a single-hop IP network, it is not mandatory to run an SPF calculation to determine the SPF routing for the oCore SPF node topology when this topology is realized over an overlay and therefore a single hop topology. Thus, the SPF instance for the oCore SPF node topology may be eliminated when using overlays and separate IGPs for the leaves. The networks sites 12a, 12b are added to the database for inclusion in the RIB and eventually the FIB. As previously discussed, leaf SPF instance is run per VRF.

As shown in FIG. 1, the OTV network leverages a single IP topology within the underlying core network 10 to form a single-hop, multi-point network 18 over multiple core IP hops. This provides a connectivity overlay for the compressed VRFs, which abstracts the multiple hops and topology of the underlying IP core (uCore). The VRFs therefore appear as directly connected to each other (i.e., adjacent or a single-hop away).

Referring again to FIG. 3, VRF related control plane (cIGP) traffic runs in the overlay core 18 rather than directly in the underlying core network 10. Thus, any functionality run in the underlying core (uCore) routing protocol is independent of any functionality run in the overlay (oCore) routing protocol, and vice versa. For example, multi-topology routing may be run in the uCore to create multi-topologies that are independent of the VRF compression done in the oCore.

As shown in FIG. 3, OTV provides the VRFs 26 with a single interface 22 for point-to-cloud connectivity. Even if the underlying IP core (uCore) has multiple physical uplinks, OTV presents the VRFs 26 with a single logical interface 22 to be configured and managed. The overlay interface 22 can multiplex data traffic from multiple VRFs by including the VRF ID in an OTV shim header, for example. Also, the single overlay interface 22 can carry traffic for all VRFs without having to create sub-interfaces or VLANs for each VRF. Thus, the overlay interface 22 does not need to support a sub-interface for every VRF instantiated. This is made possible because the resulting overlay core SPF node topology is a single shared topology realized over the base VRF 25. Since a common base topology is shared in the core, the SPF database does not require interface (link) specific information for each VRF topology. There is, therefore, no need (from the routing protocol perspective) for the creation of sub-interfaces or SVIs at the overlay interface 22 at the edge device 16.

The oCore 18 receives a list of prefixes for each subnet 12a, 12b. These prefixes are either directly connected prefixes or prefixes redistributed from other routing protocols. Compressed VRFs preferably remain a single-hop solution and do not resolve multi-hop topologies at its subnet. A separate routing protocol is provided for the handling of multi-hop subnet topologies. Compressed VRFs provide an edge overlay solution and therefore the most common deployment scenarios involve the handling of directly connected prefixes (subnets 12a, 12b) at the overlay edge.

Assignment of site interfaces 24 (i.e., interfaces at the edge of the compressed VRF/IGP domain) may be handled similar to conventional IP interface assignment to VRFs. A VRF assignment command may be issued under each IP interface to specify which VRF the interface belongs. Assignment of data traffic to OTV overlay interfaces 22 (in the case of multiple overlay networks 18), may be done based on configuration of the OTV overlay interface. For example, a command specifying which VRF IDs are to be extended via the OTV overlay 18 may define the mapping of VRFs to specific overlays. Thus, different VRFs can be mapped to different overlay networks 18. Based on the forwarding table being used, the appropriate VRF ID is dynamically added to the OTV header for correct coloring of data traffic.

It is to be understood that OTV described above is only one example of an overlay network and that other overlay or tunneling technologies, such as L2TP (Layer 2 Tunneling Protocol), VPLS (Virtual Private LAN Service), GRE (Generic Routing Encapsulation), IP encapsulation, MPLS (Multiprotocol Label Switching), and the like may be used.

Figure 6:
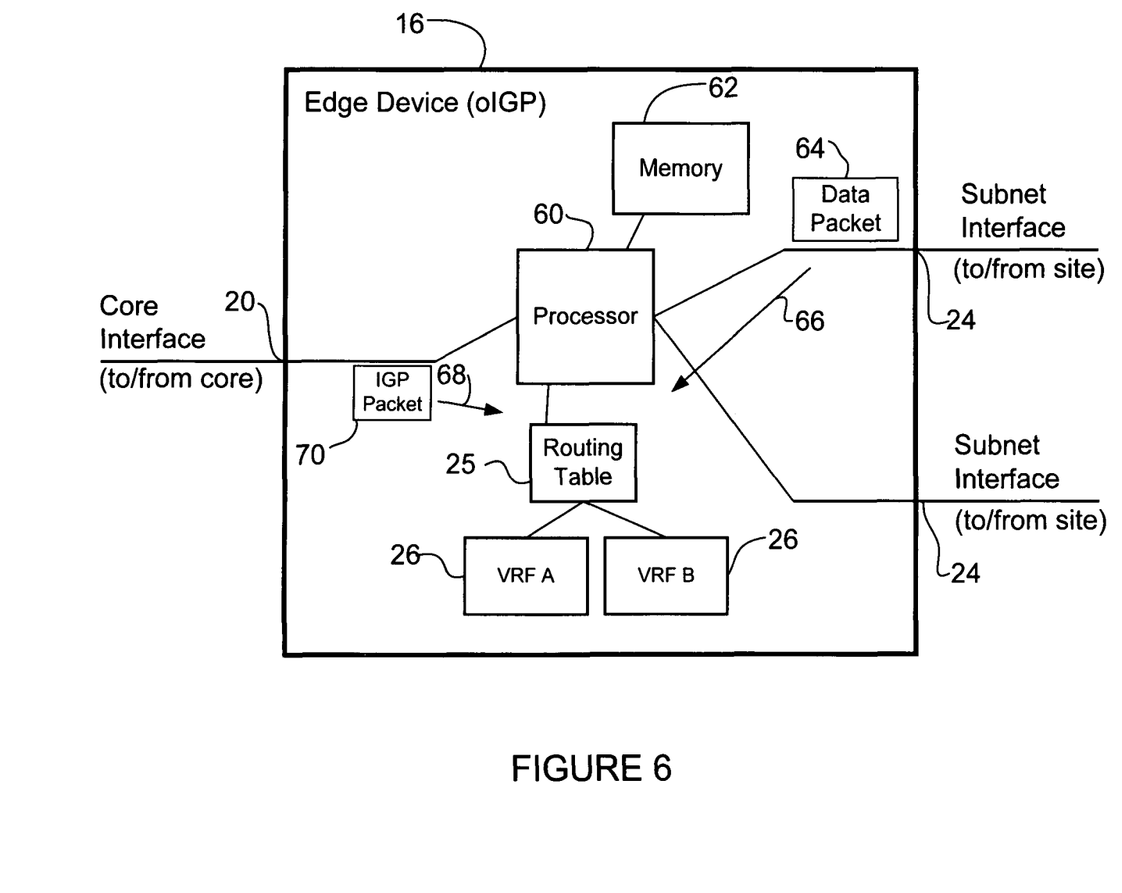
FIG. 6 is a block diagram illustrating an example of a network device useful in implementing embodiments described herein.

FIG. 6 depicts a network device (e.g., edge device 16) that may be used to implement embodiments described herein. The network device may include, for example, a processor (e.g., central processing unit (CPU), multiple processors) 60, interfaces 20, 24, and a memory 62. When acting under the control of appropriate software or firmware, the processor 60 is responsible for such tasks as forwarding table computations, network management, and general processing of packets. It preferably accomplishes all of these functions under the control of software including an operating system and any appropriate applications software. Network device 16 is configured to implement all of the network protocols and extensions thereof described herein. In one embodiment, the network device 16 is a programmable machine that may be implemented in hardware, software, or any combination thereof. Logic may be encoded in one or more tangible media for execution by the processor 60. For example, the processor 60 may execute codes stored in the memory 62. Program memory is one example of a computer-readable medium. Memory 62 may be a volatile memory. Another form of computer-readable medium storing the codes is a type of non-volatile storage such as floppy disks, CD-ROMs, DVD-ROMs, hard disks, flash memory, etc.

Network device 16 interfaces with physical media via network interfaces 20, 24. The interfaces may include Ethernet interfaces, DSL interfaces, Gigabit Ethernet interfaces, 10-Gigabit Ethernet interfaces, SONET interfaces, etc. As packets are received, processed, and forwarded by the network device 16, they may be stored in packet memory. The network device 16 may also include linecards, which may incorporate processing and memory resources similar to those discussed above in connection with the network device as a whole. It is to be understood that the network device 16 shown in FIG. 6 and described herein is only one example and that different configurations of network devices may be used.

In the example shown in FIG. 6, the edge device 16 includes two subnet interfaces 24 and a core network interface 20 (overlay interface 22) in communication with the core network 10 (overlay network 18). Traffic (data packets 64) received on the internal interfaces 24 are forwarded according to entries in the routing/forwarding tables 25, 26 onto another internal interface 24 (regular routing) or onto the core interface 20 (overlay interface 22 for OTV forwarding).

Routing information is stored in the global routing table 25 and VRF tables 26. Each network (e.g., network A, network B, VPN, etc.) has its own routing and forwarding table so that any site that belongs to a network is provided access only to the set of routes contained within that table. The edge device 16 thus contains a number of per-VRF routing tables 26 along with the global routing table 25. The VRF tables 26 may be implemented by forwarding tables, for example. The VRF tables 26 contain the routes for directly connected networks sites 12a, 12b. The global routing table 25 is populated by data-plane learning on internal interfaces 24 and by an IGP protocol (IGP packet 70) at the control plane on the core interface 20 (overlay interface 22). Arrow 66 illustrates data-plane learning on internal interface 24 and arrow 68 illustrates control-plane learning on the core interface 20 (overlay interface 22). As described above, the IGP packet 70 includes a VRF ID indicating the VRF associated with the routing update in the packet.

As can be observed from the foregoing, the embodiments described herein provide numerous advantages. For example, one or more of the embodiments provide an IP based VPN solution that is transparent to the core network. In one embodiment, OTV is leveraged for optimal multicast handling. Also, simplified VRF provisioning is provided through core transparency, single point-to-cloud interface, and no sub-interfaces. Furthermore, one or more of the embodiments may provide simplified VRF IGP monitoring via a single adjacency, core transparency, and increased VRF scalability. The embodiments may be deployed in a Data Center distribution layer through IP with no requirements to push down MPLS into distribution layer to obtain L3VPN features, for example.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
   receiving Virtual Routing and Forwarding (VRF) information at a network device, said VRF information associated with a network comprising a plurality of network sites and a VRF identifier;
   processing said VRF information at the network device, wherein processing comprises mapping said VRF identifier to an Interior Gateway Protocol (IGP) adjacency; and
   transmitting said VRF information with said VRF identifier on said IGP adjacency;
   wherein multiple VRF identifiers associated with different networks are mapped to said IGP adjacency at the network device.

2. The method of claim 1 wherein the network device is an edge device and transmitting said VRF information comprises transmitting said VRF information over a core network.

3. The method of claim 1 further comprising receiving VRF information associated with a second VRF identifier and selecting a forwarding table to update based on said second VRF identifier.

4. The method of claim 1 wherein said IGP adjacency comprises a set of IGP adjacencies.

5. The method of claim 1 wherein receiving said VRF information comprises receiving said VRF information from a first of said network sites and transmitting said VRF information comprises transmitting said VRF information to a second of said network sites, said first and second network sites belonging to the same Virtual Private Network (VPN).

6. The method of claim 1 wherein transmitting said VRF information comprises transmitting an IGP packet comprising a route update for the network associated with said VRF identifier.

7. The method of claim 1 wherein processing said VRF information further comprises inserting said VRF identifier into a multi-topology extension field in an IGP packet.

8. The method of claim 1 wherein transmitting said VRF information comprises transmitting said VRF information over a single-hop multi-point overlay network.

9. The method of claim 8 wherein transmitting said VRF information further comprises transmitting said VRF information over a single logical interface between said overlay network and the network device.

10. An apparatus comprising:
    a plurality of network site interfaces in communication with two or more networks, each of the networks associated with a different Virtual Routing and Forwarding (VRF) instance; and
    a processor configured for mapping said VRF instances to an Interior Gateway Protocol (IGP) adjacency and transmitting VRF information on said IGP adjacency along with a VRF identifier indicating the network associated with said VRF information.

11. The apparatus of claim 10 further comprising an overlay interface for communication with a core network connected to one or more other network sites.

12. The apparatus of claim 10 further comprising two or more VRF tables corresponding to the two or more networks, and wherein the processor is configured for receiving VRF information associated with a second VRF identifier and selecting one of said VRF tables to update based on said second VRF identifier.

13. The apparatus of claim 10 wherein said IGP adjacency comprises a set of IGP adjacencies.

14. The apparatus of claim 10 wherein the processor is configured to insert said VRF information in an IGP packet comprising said VRF identifier.

15. The apparatus of claim 14 wherein said VRF identifier is inserted into a multi-topology extension field in said IGP packet.

16. An apparatus comprising:

a processor for processing Virtual Routing and Forwarding (VRF) information received at the apparatus, said VRF information associated with a network comprising a plurality of network sites and a VRF identifier, wherein processing comprises mapping said VRF identifier to an Interior Gateway Protocol (IGP) adjacency, and transmitting said VRF information with said VRF identifier on said IGP adjacency;

wherein multiple VRF identifiers associated with different networks are mapped to said IGP adjacency at the network device.

17. The apparatus of claim 16 wherein the processor is further configured for inserting said VRF identifier into a multi-topology extension field in an IGP packet.

18. The apparatus of claim 16 wherein transmitting said VRF information comprises transmitting said VRF information over a single-hop multi-point overlay network.

19. The apparatus of claim 18 wherein transmitting said VRF information further comprises transmitting said VRF information over a single logical interface between said overlay network and the apparatus.

20. The apparatus of claim 16 wherein the processor is further operable to select a forwarding table to update based on said VRF identifier in a packet comprising said VRF information.

* * * * *